United States Patent [19]

Theysohn

[11] 4,050,510
[45] Sept. 27, 1977

[54] CALENDER HEATING ROLL

[76] Inventor: Helmuth Theysohn, Wiehbergstrasse 25 C, 3 Hannover, Germany

[21] Appl. No.: 635,868

[22] Filed: Nov. 28, 1975

Related U.S. Application Data

[63] Continuation of Ser. No. 463,825, April 24, 1974, abandoned.

Foreign Application Priority Data

[30] Apr. 27, 1973 Germany .............................. 2321367

[51] Int. Cl.² .............................................. F28F 5/02
[52] U.S. Cl. ......................................... 165/89; 34/124
[58] Field of Search ............... 165/89, 87, 88; 34/119, 34/124, 125

[56] References Cited

U.S. PATENT DOCUMENTS

| | | | |
|---|---|---|---|
| 2,712,924 | 7/1955 | Nicolai | 165/89 |
| 2,890,026 | 6/1959 | Marganski et al. | 165/89 |
| 3,135,319 | 6/1964 | Richards | 165/89 |
| 3,228,462 | 1/1966 | Smith, Jr. | 165/89 |
| 3,581,812 | 6/1971 | Fleissner et al. | 165/89 |
| 3,738,423 | 6/1973 | Fleissner | 165/89 |

Primary Examiner—Carroll B. Dority, Jr.
Assistant Examiner—Theophil W. Streule, Jr.
Attorney, Agent, or Firm—Robert E. Burns; Emmanuel J. Lobato; Bruce L. Adams

[57] ABSTRACT

A shell of chilled cast iron has a plurality of passages, parallel to the axis of the shell. Two end structures, also of cast iron, support the two ends of the shell. A plurality of radial passages is provided in the end structures for guiding a heating medium such as steam outwardly to and inwardly from the passages in the shell. The passages are disposed to transfer heat from the heating medium therein to the end structures and to the shell.

1 Claim, 3 Drawing Figures

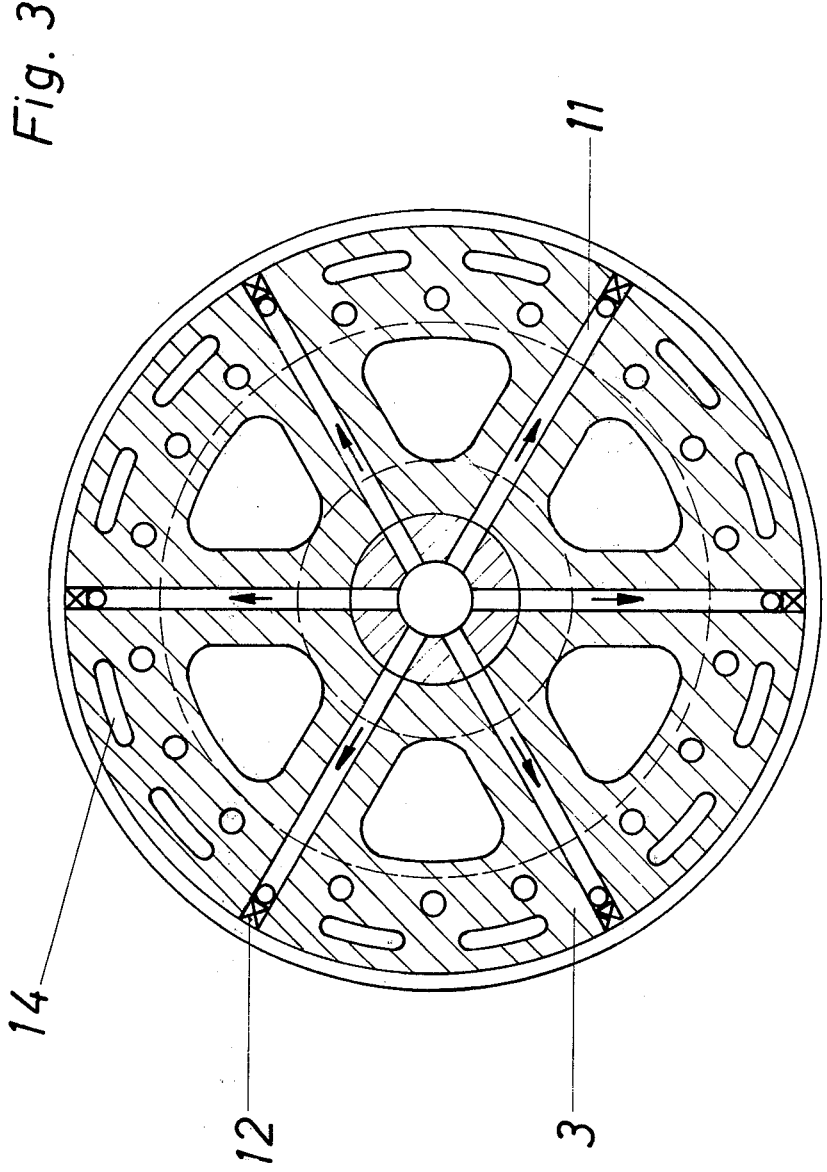

CALENDER HEATING ROLL

This is a continuation, of application Ser. No. 463,825, filed Apr. 24, 1974, now abandoned.

BACKGROUND OF THE INVENTION

This invention relates to a heating calender roll, particularly for the production of packing sheets of rubber-bonded asbestos fibers ("It" packing sheets). It is known to produce such sheets on a two-roll calender comprising a heating roll and a cooling roll. A mixture of asbestos and rubber, having a consistence ranging from that of paste to that of a crumbly mass, is fed into the nip between the roll, with uniform distribution, and is rolled at high pressure, into a thin layer. The cooling roll, which generally is smaller, is generally used as an idler, the larger and heated roll serves as driving means. The mixture is gradually built up on this roll in spiral form to provide thin layers, and is at the same time vulcanized. The vapors of solvents liberated incident to the heating up of the mass are sucked off from the calender. When the building up and vulcanization of the sheet has been completed on the heating roll the finished sheet is divided in a direction parallel to the axis of this roll and is drawn off. A finished sheet has a width equal to the length of the roll and has a length equal to the diameter of the roll.

For reasons for economy it is generally preferred to make the sheets as large as possible. This in turn calls for a correspondingly large heating roll. Conventional rolls of this kind often have a diameter of 1000 to 2000 mm and a width of 1600 to 3100 mm, corresponding to sheet dimensions which range between 1500 × 3000 mm and 3000 × 6000 mm.

Heretofore it was usual to support the shell of the heating roll (usually made of a hard material such as chilled cast iron in order to withstand the extremely high specific forces encountered during the calendering) on dome-shaped end structures flange connected to the shells; to introduce the heating medium (usually saturated steam at pressures up to 16 atmospheres) into the interior of the roll defined by the shell and two end structures; and in order to withstand the high steam pressures, to make the end structures of cast steel. Hollow trunnions have been formed on the central portions of the dome shaped end structures to support the roll on a hollow shaft (conventionally made of cast steel and arranged for the passage of heating steam into the interior of the roll and the withdrawal of condensate from this interior).

These former constructions of heating rolls have a number of drawbacks, connected with problems of heat flow through the various elements and of resulting mechanical forces. In particular:

The time required for bringing the roll to the proper operating temperature was extremely long because of the great weight and mass of the end structures as well as the shell. The roll had extremely high thermal inertia when reacting to impulses for changes of surface temperature. In addition the temperature gradient between inner and outer surfaces of the shell was high, as where the corresponding tensions in the shell and the resulting dangers of shell fracture. The wear and tear of gasket elements between the shell and the end structures was very considerable, under the rotation of the roll and the successive changes of thermal and mechanical loads on these elements. Since the cast steel of the end structures has a higher coefficient of thermal expansion than the chilled cast iron of the shell the terminal zones of the shell were exposed to greater changes of diameter than were the intermediate zones of the shell. This fact made it necessary to grind the terminal zones in slightly conical form when cold, in order to provide cylindrical form of the entire shell surface when hot, as is required for proper calendering. This requirement or necessity in turn involved much delay and cost, and could be fulfilled only by highly experienced technicians.

Still further it was necessary to have the heating roll tested and approved, for safety, as such a roll, containing a large volume of steam under high pressure, in effect was a steam kettle. The required tests were additional elements of delay and expense.

SUMMARY OF THE INVENTION

The calender roll according to the invention avoids these drawbacks of former rolls. It greatly reduces the volume of steam or other heating media in the roll. It allows the use of any desired pressure of such media. Thus it greatly reduces the need for tests and approvals. At the same time it provides maximum precision with regard to true rotation and the cylindrical form of the operating roll.

This has been achieved with the aid of a plurality of bores extending through the shell parallel to the axis, close to the surface of the shell, to provide passages for parallel and preferably meandering flows of the heating medium through the shell. Preferably this shell is supported on end structures each comprising a plurality of angularly spaced spokes, hollowed out for passage of the heating medium and centrally supported by a hollow shaft. These end structures advantageously are made of material similar to the cast iron of the shell and having a similar or at least substantially similar coefficient of thermal expansion, thereby keeping the shell cylindrical when heated. The central hollow shaft can be made of cast steel, preferably selected so as to minimize differences of thermal expansion in axial directions. The end structures comprising systems of angularly spaced spokes additionally aid in minimizing the effect of axially directed forces resulting from remaining differences of thermal expansion of the shaft and the shell.

Further characteristics and advantages of the new heating roll will appear from the detailed description which follows.

BRIEF DESCRIPTION OF DRAWINGS

FIG. 3 is a vertical section at right angles to the axis of the roll, through the end structure omitted in FIG. 2.

Figure 1:
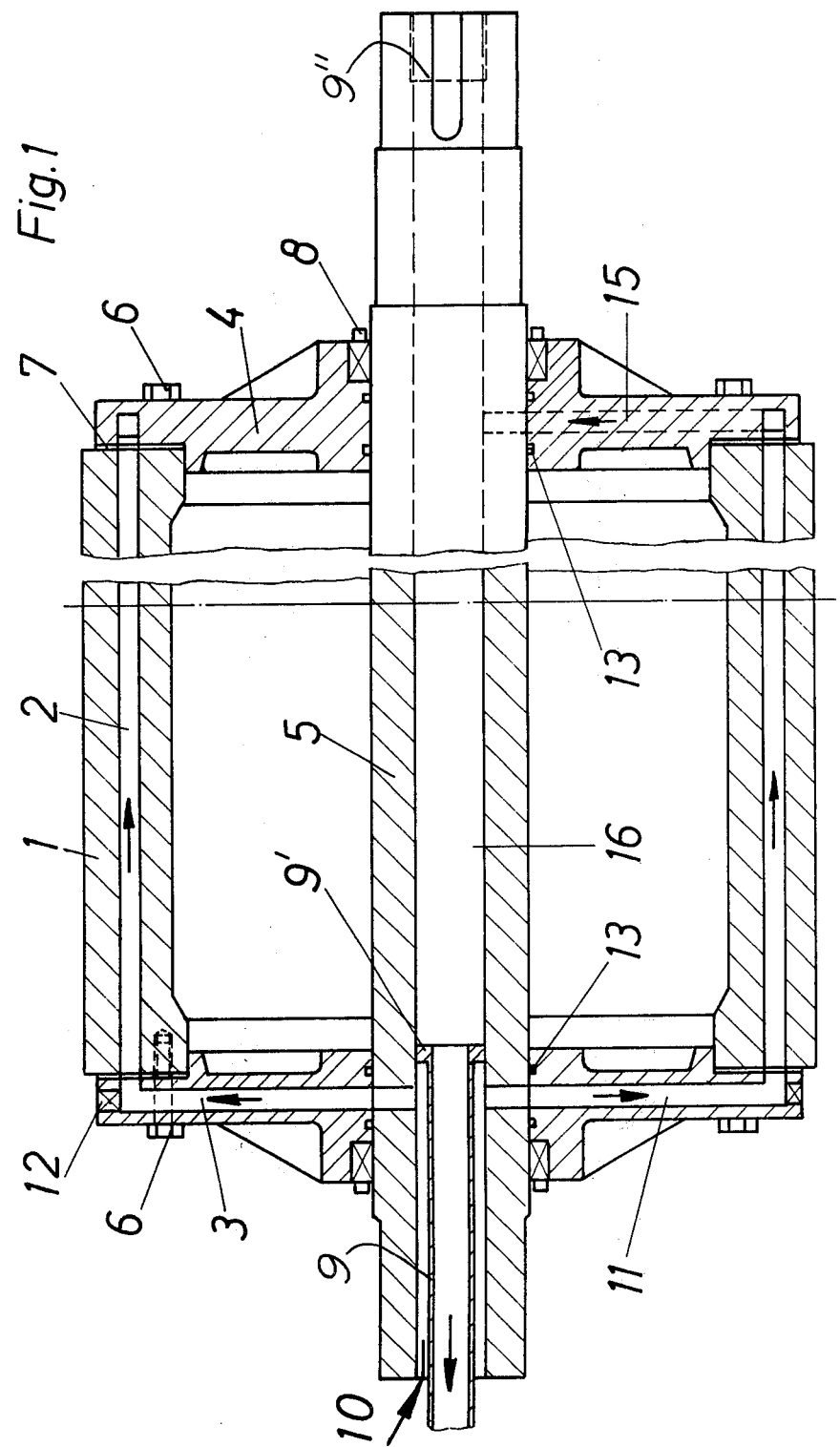
FIG. 1 is a vertical longitudinal axial section through a roll according to the invention.
Figure 2:
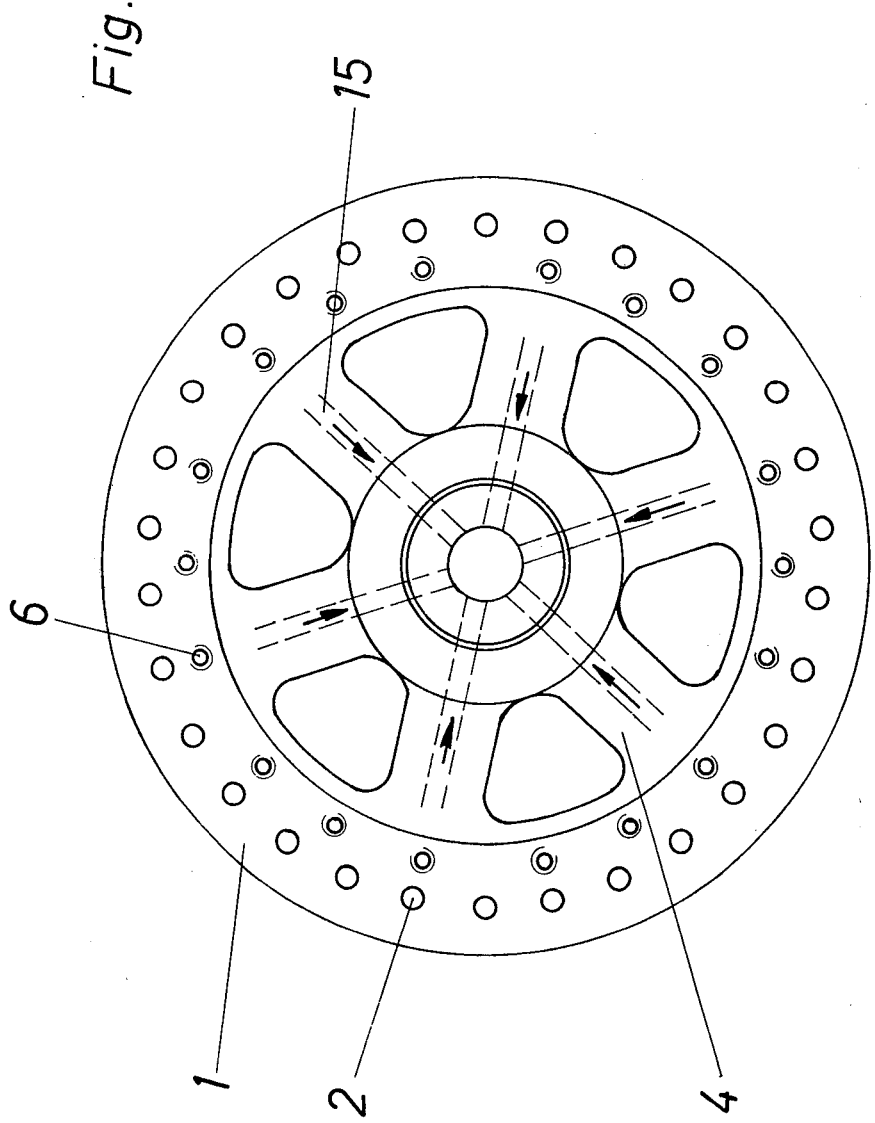
FIG. 2 is an end view of the roll with an end structure removed therefrom, the view being taken from the left side in FIG. 1 and showing the shell and the right end structure.

The shell 1 of the new roll is fabricated with a cylindrical outer surface, when cold, this surface being smooth, clean and precision ground in order to obtain proper surfaces of the sheeting produced thereon. As noted above, the shell is made of chilled cast iron. It has a series of straight bores 2 parallel to the axis of the shell, uniformly distributed in a peripheral portion of the shell close to the surface, to provide passages for the heating medium. Each end of the shell is slightly widened to provide an inwardly extending flange, connected to a similarly shaped outwardly extending flange on an end structure 3, 4 (at the left and right ends of FIG. 1, respectively). These end structures are supported by a hollow shaft 5 of cast steel, which in turn is pivoted in suitable bearings (not shown). The end structures 3 and 4 have flange connections to the ends of shell 1 by means of bolts 6 suitably distributed peripherally and extending through gasket means 7 to prevent any loss of heating medium at either end of the shell.

According to the invention the end structures 3 and 4 are made of material having similar characteristics and mainly similar coefficients of thermal expansions as the shell 1.

The end structures 3 and 4 are secured to the hollow shaft 5 with the aid of wedge clamp elements 8 to insure proper transmission of the rotary moment and proper centering of the shell 1 as well as proper connection of inlet and outlet structures for the heating medium.

The latter structures may include a conventional injection head, not shown. This supplies the heating medium from the left side in FIG. 1, through an annular space in hollow shaft 5 around an inner tube 9. The annular space 10, between the inside of shaft 5 and the outside of tube 9, extends from the area at left of the shell into and through the left end structure 3 to a flange 9' of tube 9, peripherally sealed to the inside of hollow shaft 5, as shown. At an opposite end of the roll this hollow shaft extends through the end structure 4 and is closed by a plug 9'', as also shown. Radial channels 11 are formed in end structure 3, which communicate with the annular space 10 through correspondingly located radial ports in shaft 5. The channels 11 extend outwardly to locations where they through the gasket means 7, communicate with some of the peripherally distributed bores 2 in shell 1. Outer ends of the radial passages 11 (and outer ends of corresponding passages 15 in the other end structure 4) are suitably closed by plugs 12. Seal rings 13 are interposed between inside surfaces of the end structures 3, 4 and outer surfaces of hollow shaft 5, to prevent any loss of heating medium in this area.

Grooves 14 are machined into the surfaces of end structures 3 and 4 facing the shell 1 to provide for a meandering flow of heating medium through the passages 2 in the shell. For example, when each end structure has 6 spokes as shown, the preferred construction provides six groups of axial passages, one group for each pair of spokes, and five passages in each group. For example, one of these groups extends clockwise from numeral 12 in FIG. 3. This group comprises a first passage 2 (shown in this Figure as a circle directly inside plug 12); a groove 14 in the opposite end structure; a return passage 2 from the end of this groove; a groove 14 in the first end structure etc.

It will readily be seen that partial flows of the heating medium are thus formed at the right end of the annular space 10 (FIG. 1); that these partial flows uniformly flow outwardly through the radial passages in spokes 3; that they then meander through shell 2, then flow inwardly through radial passages 15 in spokes 4; are then collected in hollow shaft 5; and finally are withdrawn through central pipe 9 in a leftward direction. It will also be seen that in this way all elements of the roll are traversed by heating medium and are uniformly heated. Temperature differences between the outer and inner surfaces of shell 1 are minimized, as are temperature differences between the end structures 3, 4, and between them and the shell 1.

It will further be seen that the concept of this invention can also be embodied in different structures, for example in structures wherein the heating medium reaches the shell through distributor tubes separate from the end structures but connected with the end structures as well as the shell; it being possible for example to place distributing point of the tubes in regions where the end structures are flange connected to the shell.

The new heating roll has the following advantages over the earlier heating rolls used for the calendering of rubber bonded asbestos fibers and the like:

a. Higher surface temperatures of shell 1 are achieved, when using the same temperatures of heating media as were formerly used.

b. The time for heating the roll to its proper operating temperature is considerably shortened and the roll reacts more rapidly to impulses of temperature regulation.

c. Reduced temperature gradients by the new arrangement of heating passages 2 near the surface of shell 1. The tensions in the shell structure and the dangers of fracture are reduced.

d. Since the new roll is heated by heating channels 2, 11, 15 of relatively small cross-section, safety-testing and inspection is no longer needed, which was required for earlier roll constructions.

e. The roll according to the invention is exceptionally safe. Even in the event that a fracture occurs, the heating medium issues only at a single place, in contrast to the conventional rolls which in such cases may explode.

f. For maximum temperatures of the surface of the shell 1, it is possible to use either steam or hot water or hot oil, the latter providing maximum temperatures at minimum pressures.

g. The cylindrical form exhibited by the surface of the shell 1 when cold is maintained at any temperature of the roll.

h. The shell is firmly connected to the steel shaft 5 by end structures 3 and 4 thereby insuring high precision of true rotation of the roll at any operating temperature.

What is claimed:

1. A heating calender roll, comprising;
a hollow cylindrical shell comprising a chill casting large enough to calender thereon a rubber-asbestos sheet having a length of several meters on each side thereof, the shell being of cast iron and having a plurality of parallel tubular bores extending through the cast iron of the hollow shell parallel to the axis of the shell at locations regularly distributed circumferentially of the shell;

first and second end structures comprising chill castings of cast iron, having similar coefficients of thermal expansion as the shell, and provided respectively at first and second ends of the hollow cylindrical shell, each end structure extending inwardly from the respective end of the shell, and having (a) a plurality of radial passages, all extending through the end structure radially of the shell at locations regularly angularly spaced from one another to match the locations of some of the parallel tubular bores extending through the shell, and all connected to such parallel tubular bores; and (b) means for maintaining a meandering flow of heating medium through said parallel tubular bores to keep heating of the chill casting of said shell uniform at and between both ends thereof, said means comprising two sets of segmental grooves, one set for each end structure and disposed therein, angularly between said radial passages, to interconnect two of said parallel tubular bores of the chill casting of said shell;

means for fastening and sealing each end structure to the respective end of the shell; and hollow shaft means centrally secured to the end structures for rotating them to rotate the shell, for passing the heating medium into the radial passages of one end structure and thereby, with assistance of the segmental grooves, into the meandering flow through the parallel tubular bores of the shell, and for receiving the heating medium from the parallel tubular bores of the shell through the other end structure, to heat the large chill casting of the shell by said medium, to similarly heat the chill castings of both end structures, and thereby to enable the shell to calender the rubber asbestos sheets.

* * * * *